US012736728B2

(12) United States Patent
Wu et al.

(10) Patent No.: US 12,736,728 B2
(45) Date of Patent: Sep. 15, 2026

(54) THREE-LAYERED STRUCTURAL COLOR MULTILAYER STRUCTURES

(71) Applicant: Toyota Motor Engineering & Manufacturing North America, Inc., Plano, TX (US)

(72) Inventors: Songtao Wu, Ann Arbor, MI (US); Debasish Banerjee, Ann Arbor, MI (US); Minjuan Zhang, Ann Arbor, MI (US)

(73) Assignees: Toyota Motor Engineering & Manufacturing North America, Inc., Plano, TX (US); Toyota Jidosha Kabushiki Kaisha, Toyota (JP)

( * ) Notice: Subject to any disclaimer, the term of this patent is extended or adjusted under 35 U.S.C. 154(b) by 468 days.

(21) Appl. No.: 18/116,601

(22) Filed: Mar. 2, 2023

(65) Prior Publication Data

US 2024/0077663 A1 Mar. 7, 2024

Related U.S. Application Data

(60) Provisional application No. 63/404,416, filed on Sep. 7, 2022.

(51) Int. Cl.
*G02B 5/28* (2006.01)

(52) U.S. Cl.
CPC .................................... *G02B 5/286* (2013.01)

(58) Field of Classification Search
CPC . G02B 5/286; G02B 1/00; G02B 1/10; G02B 1/12; G02B 5/28; G02B 5/284; G02B 5/285; G02B 5/288; C09C 1/0015; C09C 1/0024; C09C 1/003; C09C 1/0033; C09C 1/0039; C09C 2200/00; C09C 2200/10; C09C 2200/102; C09C 2200/1054; C09C 2200/24; C09C 2200/30; C09C 2200/301; C09C 2200/302; C09C 2200/304; C09C 2200/305; C09C 2200/306; C09C 2200/308; C09C 2200/50; C09C 2200/502; C09C 2210/00; C09C 2210/50;
(Continued)

(56) References Cited

U.S. PATENT DOCUMENTS

| | | | |
|---|---|---|---|
| 3,247,392 | A | 4/1966 | Thelen |
| 3,650,790 | A | 3/1972 | Klenke et al. |

(Continued)

FOREIGN PATENT DOCUMENTS

| | | | |
|---|---|---|---|
| AU | 4898500 | A | 2/2001 |
| AU | 2005202375 | A1 | 6/2005 |

(Continued)

OTHER PUBLICATIONS

Schmid, Raimund and Mronga, Norbert, "A New Generation of Sparkling Effect Pigments", Paint & Coatings Industry; Oct. 2004, vol. 20 Issue 10, p. 118-121.

(Continued)

*Primary Examiner* — Arnel C Lavarias
(74) *Attorney, Agent, or Firm* — DINSMORE & SHOHL LLP

(57) ABSTRACT

A multilayer structure that reflects color includes a core layer, and a conformal dielectric layer encapsulating the core layer. A conformal absorber layer encapsulates the conformal dielectric layer. The multilayer structure consists of three optical layers.

18 Claims, 6 Drawing Sheets

(58) Field of Classification Search
CPC ... C09C 2220/00; C09C 2220/20; C09D 5/36; C09D 5/39
USPC ........ 359/584, 577, 580, 582, 585, 586, 589
See application file for complete search history.

(56) References Cited

U.S. PATENT DOCUMENTS 3,769,515 A 10/1973 Clark, Jr.
3,885,408 A 5/1975 Clark, Jr.
3,910,681 A 10/1975 Elliott et al.
3,953,643 A 4/1976 Cheung et al.
4,079,605 A 3/1978 Bartels
4,449,126 A 5/1984 Pekker
4,525,028 A 6/1985 Dorschner
4,544,415 A 10/1985 Franz et al.
4,556,599 A 12/1985 Sato et al.
4,613,622 A 9/1986 Moeller et al.
4,643,518 A 2/1987 Taniguchi
4,673,914 A 6/1987 Lee
4,705,839 A 11/1987 Martin
4,714,308 A 12/1987 Sawamura et al.
4,753,829 A 6/1988 Panush
4,756,602 A 7/1988 Southwell et al.
4,868,559 A 9/1989 Pinnow
4,896,928 A 1/1990 Perilloux et al.
4,930,866 A 6/1990 Berning et al.
4,996,105 A 2/1991 Oyama et al.
5,007,710 A 4/1991 Nakajima et al.
5,043,593 A 8/1991 Tsutsumi et al.
RE33,729 E 10/1991 Perilloux
5,132,661 A 7/1992 Pinnow
5,138,468 A 8/1992 Barbanell
5,183,700 A 2/1993 Austin
5,214,530 A 5/1993 Coombs et al.
5,245,329 A 9/1993 Gokcebay
5,279,657 A 1/1994 Phillips et al.
5,283,431 A 2/1994 Rhine
5,323,416 A 6/1994 Bhat et al.
5,410,431 A 4/1995 Southwell
5,423,912 A 6/1995 Sullivan et al.
5,424,119 A 6/1995 Phillips et al.
5,437,931 A 8/1995 Tsai et al.
5,472,798 A 12/1995 Kumazawa et al.
5,491,470 A 2/1996 Veligdan
5,522,923 A 6/1996 Kimura et al.
5,543,665 A 8/1996 Demarco
5,561,420 A 10/1996 Kleefeldt et al.
5,569,332 A 10/1996 Glatfelter et al.
5,569,353 A 10/1996 Zodrow
5,569,535 A 10/1996 Phillips et al.
5,570,847 A 11/1996 Phillips et al.
5,571,624 A 11/1996 Phillips et al.
5,624,486 A 4/1997 Schmid et al.
5,653,792 A 8/1997 Phillips et al.
5,691,844 A 11/1997 Oguchi et al.
5,700,550 A 12/1997 Uyama et al.
5,759,255 A 6/1998 Venturini et al.
5,768,026 A 6/1998 Kiyomoto et al.
5,850,309 A 12/1998 Shirai et al.
5,889,603 A 3/1999 Roddy et al.
5,982,078 A 11/1999 Krisl et al.
6,049,419 A 4/2000 Wheatley et al.
6,055,079 A 4/2000 Hagans et al.
6,130,780 A 10/2000 Joannopoulos et al.
6,150,022 A 11/2000 Coulter et al.
6,156,115 A 12/2000 Pfaff et al.
6,157,480 A 12/2000 Anderson et al.
6,157,489 A 12/2000 Bradley, Jr. et al.
6,157,498 A 12/2000 Takahashi
6,164,777 A 12/2000 Li et al.
6,180,025 B1 1/2001 Schoenfeld et al.
6,215,592 B1 4/2001 Pelekhaty
6,242,056 B1 6/2001 Spencer et al.
6,243,204 B1 6/2001 Bradley, Jr. et al.
6,246,523 B1 6/2001 Bradley, Jr. et al.
6,249,378 B1 6/2001 Shimamura et al.
6,310,905 B1 10/2001 Shirai
6,331,914 B1 12/2001 Wood, II et al.
6,383,638 B1 5/2002 Coulter et al.
6,387,457 B1 5/2002 Jiang et al.
6,387,498 B1 5/2002 Coulter et al.
6,399,228 B1 6/2002 Simpson
6,433,931 B1 8/2002 Fink et al.
6,451,414 B1 9/2002 Wheatley et al.
6,475,273 B1 11/2002 Zimmermann et al.
6,534,903 B1 3/2003 Spiro et al.
6,565,770 B1 5/2003 Mayer et al.
6,569,527 B1 5/2003 Calhoun et al.
6,569,529 B1 * 5/2003 Phillips ................ C09C 1/0015 428/548
6,572,784 B1 * 6/2003 Coombs ................ B82Y 10/00 427/218
6,574,383 B1 6/2003 Erchak et al.
6,582,764 B2 6/2003 Fuller et al.
6,596,070 B1 7/2003 Schmidt et al.
6,618,149 B1 9/2003 Stirton
6,624,945 B2 9/2003 Fan et al.
6,667,095 B2 12/2003 Wheatley et al.
6,686,042 B1 2/2004 LeGallee
6,699,313 B2 3/2004 Coulter et al.
6,753,952 B1 6/2004 Lawrence et al.
6,841,238 B2 1/2005 Argoitia et al.
6,844,976 B1 1/2005 Firon et al.
6,873,393 B2 3/2005 Ma
6,887,526 B1 5/2005 Arlt et al.
6,894,838 B2 5/2005 Mizrahi et al.
6,903,873 B1 6/2005 Joannopoulos et al.
6,913,793 B2 7/2005 Jiang et al.
6,927,900 B2 8/2005 Liu et al.
6,997,981 B1 * 2/2006 Coombs ............... G02B 5/0825 428/404
7,049,003 B2 5/2006 Thomsen et al.
7,052,762 B2 5/2006 Hebrink et al.
7,064,897 B2 6/2006 Hebrink et al.
7,098,257 B2 8/2006 Rink et al.
7,106,516 B2 9/2006 Lotz et al.
7,123,416 B1 10/2006 Erdogan et al.
7,141,297 B2 11/2006 Condo et al.
7,169,472 B2 1/2007 Raksha et al.
7,184,133 B2 2/2007 Coombs et al.
7,190,524 B2 3/2007 Grawert et al.
7,215,473 B2 5/2007 Fleming
7,236,296 B2 6/2007 Liu et al.
7,267,386 B2 9/2007 Hesch
7,326,967 B2 2/2008 Hsieh et al.
7,329,967 B2 2/2008 Nozawa et al.
7,352,118 B2 4/2008 Chowdhury et al.
7,367,691 B2 5/2008 Lin
7,410,685 B2 8/2008 Rosenberger et al.
7,413,599 B2 8/2008 Henglein et al.
7,446,142 B2 11/2008 Meisenburg et al.
7,452,597 B2 11/2008 Bujard
7,483,212 B2 1/2009 Cho et al.
7,638,184 B2 12/2009 Yaoita et al.
7,667,895 B2 2/2010 Argoitia et al.
7,699,350 B2 4/2010 Heim
7,699,927 B2 4/2010 Henglein et al.
7,745,312 B2 6/2010 Herner et al.
7,847,342 B2 12/2010 Fukuzumi et al.
7,851,580 B2 12/2010 Li et al.
7,859,754 B2 12/2010 Falicoff
7,863,672 B2 1/2011 Jin et al.
7,903,339 B2 3/2011 Banerjee et al.
7,929,730 B2 4/2011 Huang et al.
7,980,711 B2 7/2011 Takayanagi et al.
8,013,383 B2 9/2011 Kidoh et al.
8,257,784 B2 9/2012 Grayson et al.
8,313,798 B2 11/2012 Nogueira et al.
8,323,391 B2 12/2012 Banerjee et al.
8,329,247 B2 12/2012 Banerjee et al.
8,350,314 B2 1/2013 Fukuzumi et al.
8,440,014 B2 5/2013 Kitamura et al.
8,446,666 B2 5/2013 Kurt et al.
8,542,441 B2 9/2013 Ouderkirk et al.

(56) References Cited

U.S. PATENT DOCUMENTS 8,593,728 B2 11/2013 Banerjee et al.
8,599,464 B2 12/2013 Park
8,619,365 B2 12/2013 Harris et al.
8,736,959 B2 5/2014 Grayson et al.
9,063,291 B2 6/2015 Banerjee et al.
2001/0022151 A1 9/2001 Sliwinski et al.
2002/0030882 A1 3/2002 Vitt et al.
2002/0096087 A1 7/2002 Glausch
2002/0117080 A1 8/2002 Okutsu et al.
2002/0129739 A1 9/2002 Yanagimoto et al.
2002/0182383 A1 12/2002 Phillips et al.
2003/0002157 A1 1/2003 Someno
2003/0059549 A1 3/2003 Morrow et al.
2003/0190473 A1 10/2003 Argoitia et al.
2003/0215641 A1 11/2003 Phillips et al.
2004/0047055 A1 3/2004 Mizrahi et al.
2004/0156984 A1 8/2004 Vitt et al.
2004/0179267 A1 9/2004 Moon et al.
2004/0191540 A1 9/2004 Jakobi et al.
2004/0246477 A1 12/2004 Moon et al.
2004/0252509 A1 12/2004 Lin
2004/0263983 A1 12/2004 Acree
2004/0265477 A1 12/2004 Nabatova-Gabain et al.
2005/0126441 A1 6/2005 Skelhorn
2005/0127840 A1 6/2005 Chowdhury et al.
2005/0132929 A1 6/2005 Raksha et al.
2005/0152417 A1 7/2005 Lin
2005/0235714 A1 10/2005 Lindstrom
2005/0264874 A1 12/2005 Lin
2006/0006402 A1 1/2006 Hsieh et al.
2006/0023327 A1 2/2006 Coombs et al.
2006/0030656 A1 2/2006 Tarng et al.
2006/0081858 A1 4/2006 Lin et al.
2006/0145172 A1 7/2006 Su et al.
2006/0155007 A1 7/2006 Huber
2006/0159922 A1 7/2006 O'Keefe
2006/0222592 A1 10/2006 Burda
2007/0097509 A1 5/2007 Nevitt et al.
2007/0221097 A1 9/2007 Tarng et al.
2009/0046368 A1 2/2009 Banerjee et al.
2009/0082659 A1 3/2009 Ham et al.
2009/0153953 A1 6/2009 Banerjee et al.
2009/0161220 A1 6/2009 Banerjee et al.
2009/0196319 A1 8/2009 Hori et al.
2009/0241802 A1 10/2009 Nemoto et al.
2009/0303044 A1 12/2009 Furuichi et al.
2009/0318614 A1 12/2009 Chevalier
2009/0321693 A1 12/2009 Ohkuma et al.
2010/0064938 A1 3/2010 Voit et al.
2010/0208338 A1 8/2010 Banerjee et al.
2010/0209593 A1 8/2010 Banerjee et al.
2010/0213485 A1 8/2010 McKenzie et al.
2011/0014366 A1 1/2011 Nogueira et al.
2011/0091658 A1 4/2011 Banerjee et al.
2011/0113984 A1 5/2011 Fuller, Jr. et al.
2011/0128616 A1 6/2011 Banerjee et al.
2011/0134515 A1 6/2011 Banerjee et al.
2011/0214733 A1 9/2011 den Boer et al.
2011/0228399 A1 9/2011 Ohnishi
2011/0266879 A1 11/2011 Kim et al.
2011/0267247 A1 11/2011 Choi et al.
2011/0299154 A1 12/2011 Grayson et al.
2012/0015056 A1 1/2012 Lee
2012/0050848 A1 3/2012 Carlson et al.
2012/0107584 A1 5/2012 Eibon et al.
2012/0153527 A1 6/2012 Banerjee et al.
2012/0307369 A1 12/2012 Banerjee et al.
2013/0119298 A1 5/2013 Raksha et al.
2013/0148221 A1 6/2013 Banerjee et al.
2013/0213260 A1 8/2013 Kunii
2013/0250403 A1 9/2013 Maeda
2013/0265668 A1 10/2013 Banerjee et al.
2014/0018439 A1 1/2014 Gruner et al.
2014/0111861 A1 4/2014 Banerjee et al.
2014/0133045 A9 5/2014 Banerjee et al.
2014/0211303 A1 7/2014 Banerjee et al.
2014/0368918 A1 12/2014 Banerjee et al.
2015/0033988 A1 2/2015 Wu et al.
2015/0138641 A1 5/2015 Delst et al.
2015/0138642 A1 5/2015 Banerjee et al.
2015/0309231 A1 10/2015 Banerjee
2015/0309232 A1 10/2015 Banerjee

FOREIGN PATENT DOCUMENTS

CA 2550190 A1 12/2006
CN 1132773 A 10/1996
CN 1217734 A 5/1999
CN 1313953 A 9/2001
CN 1425046 A 6/2003
CN 1471562 A 1/2004
CN 1527100 A 9/2004
CN 1202429 C 5/2005
CN 1622981 A 6/2005
CN 1637078 A 7/2005
CN 1741246 A 3/2006
CN 1823023 A 8/2006
CN 1930599 A 3/2007
CN 101027365 A 8/2007
CN 101059573 A 10/2007
CN 101105547 A 1/2008
CN 101288007 A 10/2008
CN 101396884 A 4/2009
CN 101619176 A 1/2010
CN 101765791 A 6/2010
CN 101883826 A 11/2010
CN 102132214 A 7/2011
CN 102627874 A 8/2012
CN 102741358 A 10/2012
CN 102803174 A 11/2012
CN 103502333 A 1/2014
CN 103507322 A 1/2014
CN 103513316 A 1/2014
CN 103874939 A 6/2014
CN 203849448 U 9/2014
CN 104380150 A 2/2015
CN 104619668 A 5/2015
CN 104730737 A 6/2015
CN 103402117 B 8/2015
DE 2106613 A1 8/1971
DE 19823732 A1 12/1999
DE 102014119261 A1 6/2015
EP 141143 B1 5/1985
EP 0927371 B1 7/1999
EP 1937781 B1 12/2009
EP 1499568 B1 12/2012
EP 2910985 A1 8/2015
JP H0246366 A 2/1990
JP H0312605 A 1/1991
JP H05241017 A 9/1993
JP H06016965 A 1/1994
JP H06118229 A 4/1994
JP 07034324 2/1995
JP H7-268241 A 10/1995
JP H07258579 A 10/1995
JP H8-259840 A 10/1996
JP H10202813 A 8/1998
JP H1112489 A 1/1999
JP H11101913 A 4/1999
JP H11504953 A 5/1999
JP 2000220331 A 8/2000
JP 2000329933 A 11/2000
JP 2002080749 A 3/2002
JP 2002090522 A 3/2002
JP 2003050311 A 2/2003
JP 2003053875 A 2/2003
JP 2003329824 A 11/2003
JP 2004505158 A 2/2004
JP 2004134743 A 4/2004
JP 2004510013 A 4/2004
JP 2004512394 A 4/2004
JP 2004233500 A 8/2004
JP 2005513207 A 5/2005
JP 2005144925 A 6/2005

(56) References Cited

FOREIGN PATENT DOCUMENTS

| | | | |
|---|---|---|---|
| JP | 2006506518 | A | 2/2006 |
| JP | 2006097426 | A | 4/2006 |
| JP | 3799696 | B2 | 7/2006 |
| JP | 2006193738 | A | 7/2006 |
| JP | 2006285196 | A | 10/2006 |
| JP | 2007065232 | A | 3/2007 |
| JP | 2007510022 | A | 4/2007 |
| JP | 2007133325 | A | 5/2007 |
| JP | 2007183525 | A | 7/2007 |
| JP | 2008038382 | A | 2/2008 |
| JP | 2008508404 | A | 3/2008 |
| JP | 2008510866 | A | 4/2008 |
| JP | 2008526002 | A | 7/2008 |
| JP | 2008191592 | A | 8/2008 |
| JP | 2008209520 | A | 9/2008 |
| JP | 2008230218 | A | 10/2008 |
| JP | 2008257777 | A | 10/2008 |
| JP | 2009042763 | A | 2/2009 |
| JP | 2009511725 | A | 3/2009 |
| JP | 2010502433 | A | 1/2010 |
| JP | 2010526015 | A | 7/2010 |
| JP | 2010191431 | A | 9/2010 |
| JP | 4948706 | B2 | 6/2012 |
| JP | 2013518946 | A | 5/2013 |
| JP | 2014237819 | A | 12/2014 |
| JP | 2015120350 | A | 7/2015 |
| JP | 2016027095 | A | 2/2016 |
| JP | 2016049777 | A | 4/2016 |
| JP | 2019219696 | A | 12/2019 |
| TW | 200417759 | A | 9/2004 |
| TW | 201013236 | A | 4/2010 |
| WO | 9936258 | A1 | 1/1999 |
| WO | 99/42892 | A1 | 8/1999 |
| WO | 0012634 | A1 | 3/2000 |
| WO | 2000/022466 | A1 | 4/2000 |
| WO | 0031571 | A1 | 6/2000 |
| WO | 02054030 | A2 | 7/2002 |
| WO | 03062871 | A1 | 7/2003 |
| WO | 2003062871 | A1 | 7/2003 |
| WO | 2015153043 | A1 | 10/2015 |

OTHER PUBLICATIONS

Sajeev John et al., "Photonic Band Gap Materials: A Semiconductor for Light", Department of Physics, University of Toronto, p. 1-23; 2001.

Distributed Bragg Reflector; en.wikipedia.org/wiki/Bragg_reflector (2005).

Photonic Crystal; en.wikipedia.org/wiki/Photonic_crystals (2003).

Tikhonravov, et al., "Application of the Needle Optimization Technique to the Design of Optical Coatings", Applied Optics, Optical Society of America, 1996, pp. 5493-5508, vol. 35, No. 28.

Tikhonravov, Alexander V. et al., "Optical Coating Design Algorithm Based on the Equivalent Layers Theory", Applied Optics: vol. 45, No. 7; Mar. 2006; pp. 1530-1538.

Kaminska, Kate et al., "Birefringent Omnidirectional Reflector", Applied Optics, vol. 43, No. 7, Mar. 2004, pp. 1570-1576.

Deopura, M. "Dielectric Omnidirectional Visible Reflector," Optics Letters, Aug. 1, 2001, vol. 16, No. 15.

Bing-Xin Wei et al., "Detrimental Thixotropic Thinning of Filter Cake of SiO2-Al2O3 Composite Coaled TiO2 Particles and Its Control", Industrial & Engineering Chemistry Research, Sep. 27, 2011, 50, pp. 13799-13804.

Hongqiang et al, "Disordered dielectric high reflectors with broadband from visible to infrared," Applied Physics Letters, American Institute of Physics, Melville, NY, US, vol. 74, No. 22, dated May 31, 2009.

Xifre-Perez et al, "Porous silicon mirrors with enlarged omnidirectional band gap," Journal of Applied Physics, American Institute of Physics, Melville, NY, US, vol. 97, No. 6, dated Mar. 9, 2005.

"Laser 2000 Gmbttp:/ /www. laser2000. de/fileadm in/Produkdaten/ SK _ WEB/Datenblaetter _ S EM/S EM ROCK-Stopline- Notchfilter. pdf, accessed Feb. 2, 2010".

Bendiganavale A.K., Malshe, V.C., "Infrared Reflective Inorganic Pigments", Recent Patents on Chemical Engineering, 2008, 1, 67-79.

D.P. Young, Jr., et al. "Comparison of Avian Responses to UV-Light Reflective Paint on Wind Turbines," National Renewable Energy Laboratory, Subcontract Report, Jan. 2003.

Maier, E.J. "To Deal With the Invisible": On the biological significance of ultraviolet sensitivity in birds. Naturwissenschaften 80: 476-478, 1993.

Nixon, J., "Twinkle, Twinkle Little Star," Asia Pacific Coating Journal, Feb. 2004.

Fink, Joel "A Dielectric Omnidirectional Reflector", E.L. Thomas, Science, vol. 282, Nov. 27, 1988.

Lin, Wei Hua, "Design and Fabrication of Omnidirectional Reflectors in the Visible Range" Journal of Modern Optics, vol. 52, No. 8, 1155 (2005).

Chen, Kevin M. "SiO2/TiO2 Omnidirectional Reflector and Microcavity Resonator Via the Sol-Gel Method", Appl. Phys. Lett., vol. 75, No. 24, Dec. 13, 1999.

Almedia, R.M., "Photonic Bandgap Materials and Structures by Sol-Gel Processing", Journal of Non-Crystalline Solids, 405-499 (2003).

Decourby, R.G., "Planar Omnidirectional Reflectors in Chalcogenide Glass and Polymer" Optics Express, 6228, Aug. 8, 2005.

Clement, T.J., "Improved Omnidirectional Reflectors in Chalcogenide Glass and Polymer by Using the Silver Doping Technique", Optics Express, 14, 1789 (2006).

Bryant, A., "All-Silicon Omnidirectional Mirrors Based on One-Dimensional Crystals", Appl. Phys. Lett. Vol. 82, No. 19, May 12, 2003.

Chigrin, D.N., "Observation of Total Omnidirectional Reflection From a One-Dimensional Dielectric Lattice", Appl. Phys. A. 68, 25-28 (1999).

Park, Y., "GaAs-based Near-infrared Omnidirectional Reflector", Appl. Phys. Lett., vol. 82, No. 17, Apr. 28, 2003.

H-Y Lee, "Design and Evaluation of Omnidirectional One-Dimensional Photonic Crystals", Journal of Appl. Phys. Vol. 93, No. 2, Jan. 15, 2003.

Banerjee, Debasish, "Narrow-band Omnidirectional Structural Color", SAE World Congress 01-1049 (2008).

M. Deopura et al., Dielectric Omnidirectional Visible Reflector; Optical Society of America; vol. 26, No. 15; Department of Material Science and Engineering, Massachusetts Institute of Technology; pp. 1197-1199(2001).

Chinese office action for application 202010092655.1 mail date Jun. 3, 2021 (107 pages with English translation).

Chinese office action for application 202010092655.1 mail date Nov. 22, 2021 (10 pages with English translation).

Chinese office action for application 202010215691.2 mail date Jul. 16, 2021 (23 pages with English translation).

Chinese office action for application 202010215691.2 mail date Dec. 13, 2021 (13 pages with English translation).

Chinese office action for application 202010402572.8 mail date Jul. 21, 2021 (13 pages with English translation).

Chinese office action for application 202010402572.8 mail date Dec. 30, 2021 (16 pages with English translation).

Chinese office action for application 202010927458.7 mail date Sep. 15, 2021 (10 pages with English translation).

Chinese office action for application 202010927458.7 mail date Jan. 19, 2022 (13 pages with English translation).

Optical Thin Film Technology, Lu Jinjun, Liu Weiguo, Northwestern Polytechnical University Press, pp. 181-187, Oct. 2015.

Varieties and Application of Organic Pigments, Shen Yongjia, Chemical Industry Press, pp. 486-490, Jul., 2001.

Handbook of Inorganic Fine Chemicals, Le Zhiqiang, Tianjin Chemical Industry Research and Design Institute, Chemical Industry Press, pp. 1209-1212, Jan. 2001.

Japanese office action for application 2020-105083 mail date Sep. 7, 2021 (14 pages with English Translation).

Japanese office action for application 2020-105083 mail date May 10, 2022 (5 pages with English Translation).

Chinese office action for application 202010173026.1 mail date Oct. 8, 2022 (6 pages with English Translation).

(56) References Cited

OTHER PUBLICATIONS

Japanese office action for application 2022-059572 mail date Feb. 16, 2023 (10 pages with English Translation).
German office action for application 10 2015 112 412.2 mail date Mar. 13, 2023 (13 pages with English Translation).
Zhao, Y. [ et al.]: Nanostructured Nb2O5 catalysts. In: Nano Reviews, vol. 3, 2012, No. 17631. ISSN 2000-5121.
Office Action dated Sep. 5, 2018 pertaining to Japanese Patent Application No. 2014-117702.
Office Action dated Jun. 4, 2019 pertaining to Japanese Patent Application No. 2014-117702.
Office Action dated Sep. 30, 2018 pertaining to Chinese Patent Application No. 201410693385.4.
Office Action dated Apr. 22, 2019 pertaining to Chinese Patent Application No. 201410693385.4.
Office Action dated Sep. 21, 2018 pertaining to German Patent Application No. 10 2014 119 261.3.
Office Action dated Feb. 5, 2019 pertaining to Japanese Patent Application No. 2016-559529.
Office Action dated Jul. 12, 2018 pertaining to Chinese Patent Application No. 201580026216.8.
Office Action dated Apr. 1, 2019 pertaining to Chinese Patent Application No. 201580026216.8.
Office Action dated Oct. 9, 2019 pertaining to Chinese Patent Application No. 201580026216.8.
International Preliminary Report on Patentability dated Oct. 4, 2016 pertaining to PCT/US2015/018640, filed Mar. 4, 2015.
International Search Report and Written Opinion dated May 29, 2015 pertaining to PCT/US2015/018640, filed Mar. 4, 2015.
Office Action dated Nov. 2, 2018 pertaining to Chinese Patent Application No. 201510498432.4.
Office Action dated Jun. 28, 2019 pertaining to Chinese Patent Application No. 201510498432.4.
Office Action dated Dec. 3, 2019 pertaining to Chinese Patent Application No. 201510498432.4.
Office Action dated May 28, 2019 pertaining to Japanese Patent Application No. 2015-160731.
Office Action dated Mar. 20, 2018 pertaining to Japanese Patent Application No. 2015-169044.
Office Action dated Feb. 8, 2018 pertaining to German Patent Application No. 102015113535.3.
Office Action dated Sep. 4, 2018 pertaining to Chinese Patent Application No. 201510624641.9.
Office Action dated Nov. 5, 2019 pertaining to Japanese Patent Application No. 2016-014076.
Office Action dated Jul. 16, 2019 pertaining to Chinese Patent Application No. 201610040211.7.
Office Action dated Oct. 29, 2018 pertaining to Chinese Patent Application No. 201610397388.2.
Office Action dated Jun. 4, 2019 pertaining to Chinese Patent Application No. 201610397388.2.
Office Action dated May 29, 2018 pertaining to Japanese Patent Application No. 2016-113282.
Office Action dated Apr. 16, 2019 pertaining to Japanese Patent Application No. 2016-113282.
Office Action dated Oct. 29, 2018 pertaining to Chinese Patent Application No. 201610397718.8.
Office Action dated Jun. 5, 2018 pertaining to Japanese Patent Application No. 2016-113434.
Office Action dated Oct. 25, 2018 pertaining to Chinese Patent Application No. 201610395759.3.
Office Action dated Jun. 4, 2019 pertaining to Chinese Patent Application No. 201610395759.3.
Office Action dated May 29, 2018 pertaining to Japanese Patent Application No. 2016-113285.
Office Action dated Apr. 16, 2019 pertaining to Japanese Patent Application No. 2016-113285.
Office Action dated Jul. 10, 2019 pertaining to Chinese Patent Application No. 201710284783.4.
Office Action dated Sep. 18, 2018 pertaining to Japanese Patent Application No. 2017-085886.
Office Action dated Jun. 4, 2019 pertaining to Japanese Patent Application No. 2017-085886.
Office Action dated Jan. 23, 2013 pertaining to Japanese Patent Application No. 2008-208255.
Office Action dated Feb. 26, 2014 pertaining to Japanese Patent Application No. 2008-208255.
Office Action dated Sep. 30, 2014 pertaining to Japanese Patent Application No. 2008-208255.
Office Action dated Jan. 30, 2017 pertaining to Japanese Patent Application No. 2010-114777.
Office Action dated Jan. 29, 2015 pertaining to Japanese Patent Application No. 2011-126545.
Office Action dated Jun. 23, 2015 pertaining to Japanese Patent Application No. 2011-126545.
Office Action dated Jan. 27, 2014 pertaining to Japanese Patent Application No. 2011-213056.
Office Action dated Nov. 20, 2014 pertaining to Japanese Patent Application No. 2011-213056.
Office Action dated Aug. 15, 2017 pertaining to Japanese Patent Application No. 2013-167895.
Office Action dated Feb. 20, 2018 pertaining to Japanese Patent Application No. 2013-167895.
English Translation of German office action for application 10 2016 110 192.3 mail date Jan. 11, 2021 (12 pages).
English Translation of German office action for application 10 2016 110 314.4 mail date Jan. 11, 2021 (13 pages).
English Translation of German office action for application 10 2016 110 095.1 mail date Jan. 11, 2021 (13 pages).
German office action for application 11 2010 001 362.4 mail date May 10, 2021 (12 pages with English translation).
Chinese office action for application 202010927458.7 mail date Apr. 16, 2021 (27 pages with English translation).
German office action for application 10 2017 107 230.6 mail date Feb. 2, 2021 (14 pages with English translation).
Japanese office action for application 2020-002230 mail date Feb. 8, 2021 (5 pages with English translation).
International Search Report and the Written Opinion for Application No. PCT/US2023/032077 mail dated Dec. 7, 2023 (25 pages).

* cited by examiner

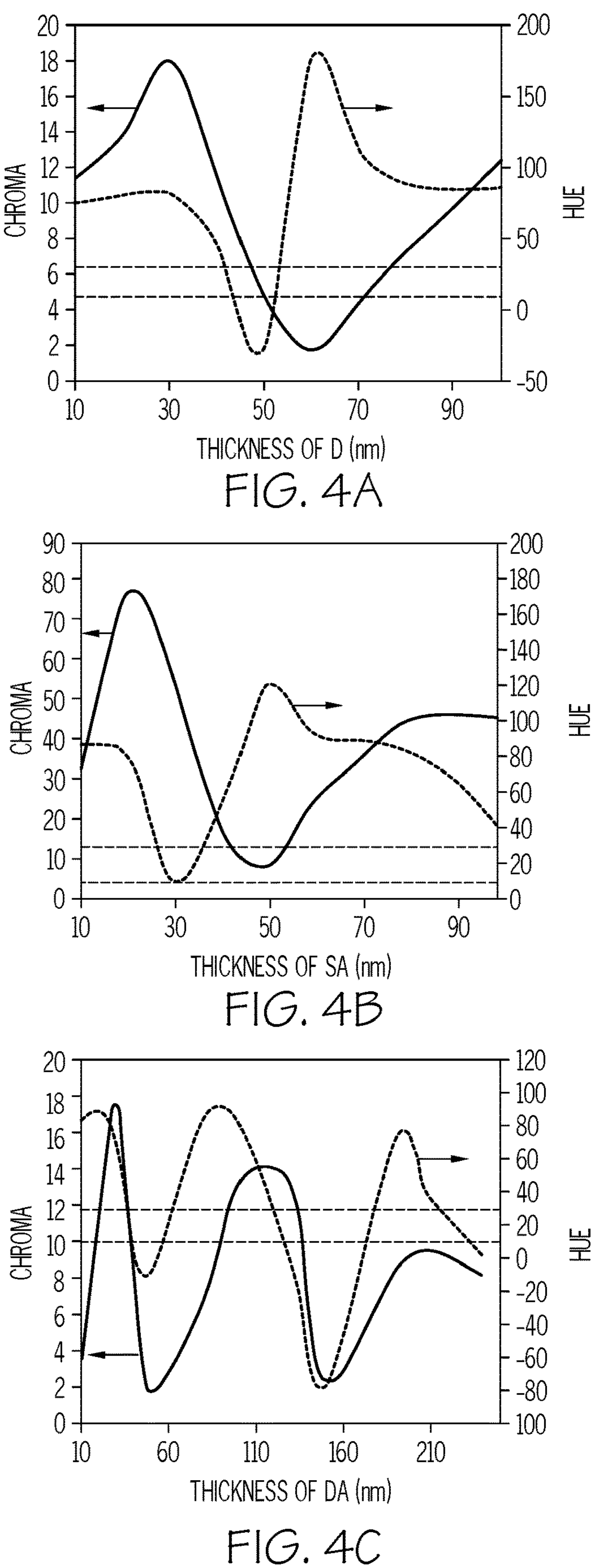
FIG. 4A
FIG. 4B
FIG. 4C

THREE-LAYERED STRUCTURAL COLOR MULTILAYER STRUCTURES

CROSS-REFERENCE TO RELATED APPLICATION

This application claims the benefit of priority under 35 U.S.C. § 119 of U.S. Provisional Application Ser. No. 63/404,416 filed on Sep. 7, 2022, the content of which is relied upon and incorporated herein by reference in its entirety.

FIELD

The present disclosure is related to multilayer structures, and in particular to multilayer structures comprising metal and metal oxide over a substrate, where at least one of the metal and metal oxide are deposited by atomic layer deposition.

BACKGROUND

Pigments made from multilayer structures are known. In addition, pigments that exhibit or provide structural color are also known. However, such prior art pigments have required nine, eleven, or more thin film layers in order to obtain desired color properties.

It is appreciated that cost associated with the production of multilayer pigments is proportional to the number of layers required. As such, the cost associated with the production of structural colors using multilayer stacks of dielectric materials can be prohibitive. Therefore, a structural color that requires a minimum number of thin film layers would be desirable.

SUMMARY

According to embodiments, a multilayer structure that reflects color comprises: a core layer; a conformal dielectric layer encapsulating the core layer; and a conformal absorber layer encapsulating the conformal dielectric layer, wherein the multilayer structure consists of three optical layers.

According to embodiments, as method for forming the multilayer structures comprise depositing the conformal dielectric layer onto the core layer by CVD or ALD; and depositing the conformal absorber layer onto the conformal dielectric layer by ALD.

Additional features and advantages will be set forth in the detailed description that follows, and in part will be readily apparent to those skilled in the art from that description or recognized by practicing the embodiments described herein, including the detailed description that follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

FIG. 4A graphically depicts chroma and hue values as a function of dielectric layer thickness for the multilayer structures illustrated in FIG. 2A;

FIG. 4B graphically depicts chroma and hue values as a function of semiconductor absorber layer thickness for the multilayer structure illustrated in FIG. 2B;

FIG. 4C graphically depicts chroma and hue values as a function of dielectric layer thickness for the multilayer structure illustrated in FIG. 2C;

DETAILED DESCRIPTION

Figure 1:
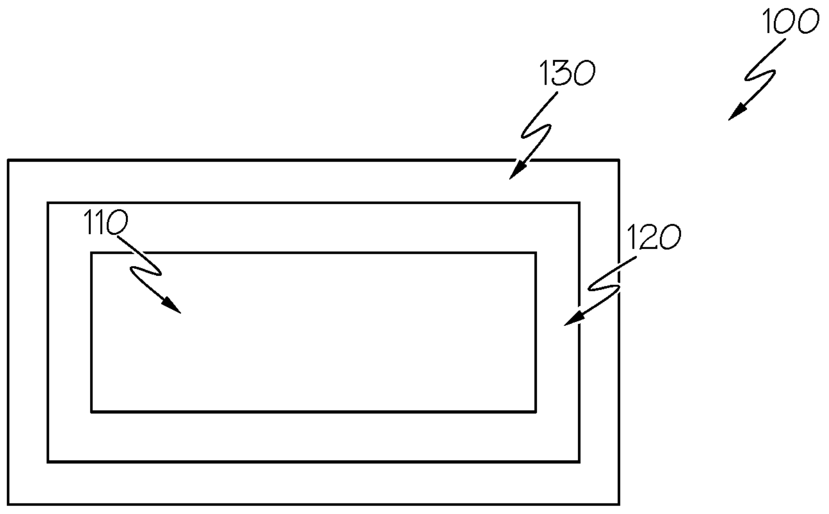
FIG. 1 is a schematic cross section of a multilayer structure according to embodiments disclosed and described herein.

A structure that produces color is provided in this disclosure. The structure that produces color has the form of a multilayer structure that may reflect a narrow band of electromagnetic radiation in the visible spectrum and has a small or non-noticeable hue shift when the multilayer structure is viewed from angles between 0 to 45 degrees. The multilayer structure can be used as pigment in compositions (such as, for example, a paint composition), a film on a structure, and the like.

Preparing color multilayer structures can be a complex, expensive process because, in part, very tight control over layer thicknesses is required. The deposition methods used to deposit layers can vary in complexity and cost depending on the material that makes up a given layer and the desired thickness of the layer. Accordingly, different materials that make up a given layer and the desired thickness of the layer.

However, it can be challenging to deposit layers directly on a reflective core layer, such as an aluminum (Al) reflective core, and it can be difficult to deposit materials in layers having a nanoscale thicknesses. Atomic layer deposition (ALD) is one technique that is good at doing both, but ALD deposition has heretofore been costly and time consuming. For instance, ALD deposits material essentially on an atomic level, so it can take a large amount of time to deposit thick layers using an ALD process, such as layers having a thickness greater than 500 nm. Accordingly, ALD is typically not preferred for depositing every layer in a multilayer structure. Typically, because of the cost and time constraints, ALD has been reserved for depositing very thin layers, and layers applied by previous ALD methods created low quality layers that may have poor coverage or high porosity that make it difficult to apply additional high-quality metal and/or metal oxide layers to the multilayer structure.

However, as disclosed herein, it has been found that depositing all layers of a multilayer structure using ALD provides layers with properties—such as surface areas and pore volumes—that can allow a microlayer structure with three layers to perform in the same manner as multilayer structures with significantly more layers. Specifically, embodiments disclosed herein use ALD processes to deposit dense, non-porous metal and/or metal oxide layers to a reflector (such as Al). The quality of the layers deposited by ALD allows three-layer OSC multilayer structures that have optical properties that are similar to five- and seven-layered OSC multilayered structures. By decreasing the number of layers deposited to the multilayered structure, cost and time of manufacture can be decreased.

The multilayer structures described herein may be used to reflect wavelengths of visible light over a range of angles of incidence or viewing (such as hues between 0° and 120°). It will be understood that the terms “electromagnetic wave,” “electromagnetic radiation,” and “light,” as used herein, may interchangeably refer to various wavelengths of light incidence on a multilayer structure and that such light may have wavelengths in the ultraviolet (UV), infrared (IR), and visible portions of the electromagnetic spectrum.

As used herein, a “core layer” refers to a reflective core layer and a non-reflective core layer, and the “core layer” may have any shape including, but not limited to a flake, a sphere, an ovoid, and the like. As used herein, an “absorber layer” includes a metallic absorber layer and a non-metallic absorber layer.

Referring now to FIG. 1, a multilayer structure 100 according to embodiments disclosed and described herein comprises a core layer 110, a conformal dielectric layer 120 that encapsulates the core layer 110, and a conformal absorber layer 130 that encapsulates the conformal dielectric layer 120. Multilayer structures 100 disclosed and described herein consist of three optical layers. These “optical layers” are layers that effect the optics of the multilayer structure 100, such as layers made from reflective materials, dielectric materials, and absorber materials where the layers are thick enough to affect the optics of the multilayer structure. The term “optical layers” as used herein does not include thin barrier layers that do not affect the optics of the multilayer structure.

Figure 2A:
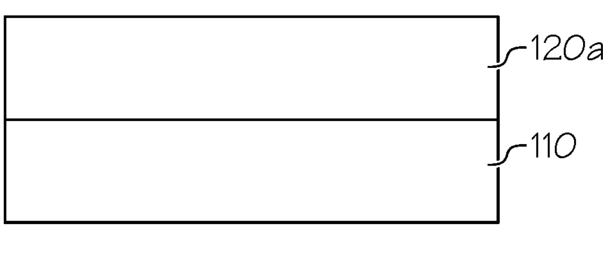
FIG. 2A depicts a multilayer structure with a dielectric layer extending over a core layer used in the design of a multilayer structure.
Figure 2B:
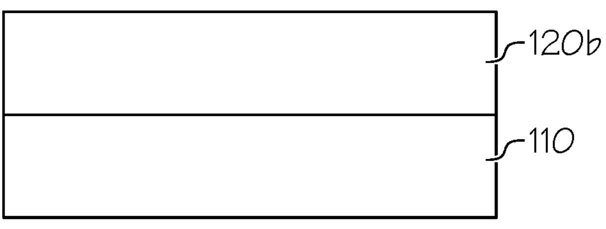
FIG. 2B depicts a multilayer structure with an absorber layer extending over a core layer used in the design of a multilayer structure.
Figure 2C:
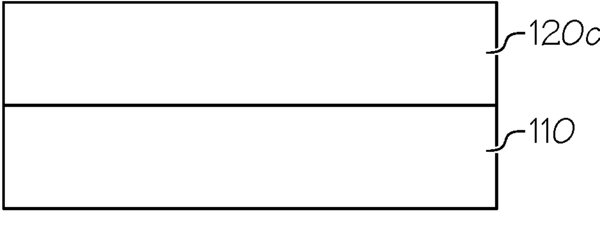
FIG. 2C depicts a multilayer structure with a dielectric layer extending over a core layer used in the design of multilayer structure according to one or more embodiments shown and described herein.
Figure 3:
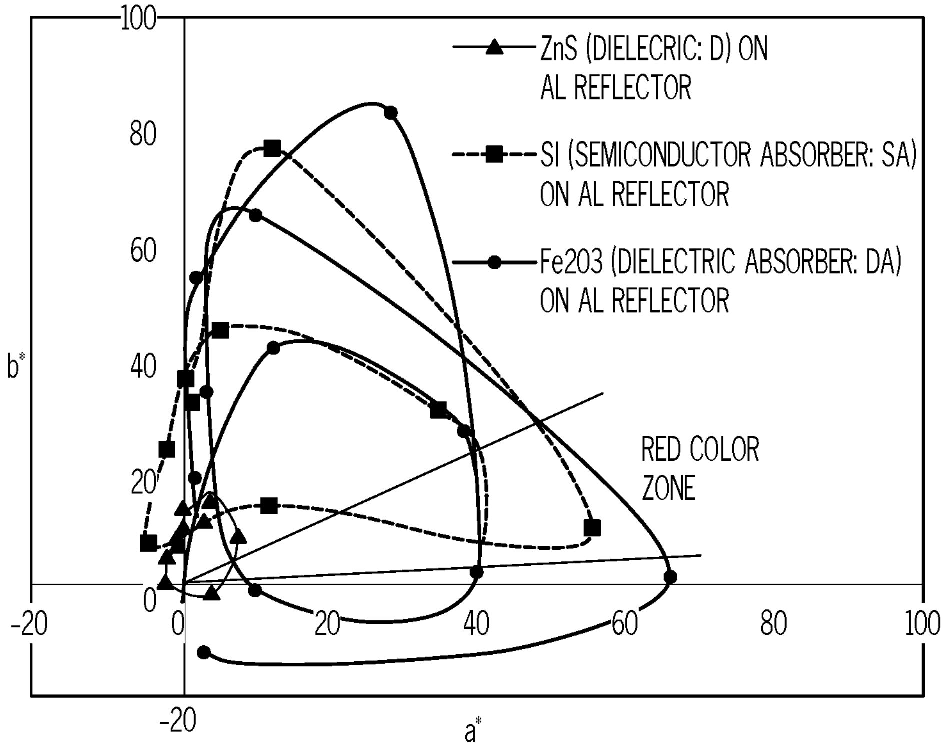
FIG. 3 depicts reflectance properties of the multilayer structures illustrated in FIGS. 2A-2C on a Lab color space.

Referring to FIGS. 2A-2C and 3, the effectiveness of different types of layers extending across a core layer 110 in attaining a desired hue level in a desired region of the visible light spectrum as plotted or shown on a Lab color space is depicted. FIG. 2A depicts a ZnS dielectric layer 120*a* extending across a reflective core layer 110, FIG. 2B depicts a Si semiconductor absorber layer 120*b* extending across a reflective core layer 110, and FIG. 2C depicts a $Fe_2O_3$ dielectric layer 120*c* extending across a reflective core layer 110. Simulations of the reflectance from each multilayer structure illustrated in FIGS. 2A-2C are performed as a function of different thicknesses for the dielectric layer 120*a*, the semiconductor absorber layer 120*b*, and dielectric layer 120*c*. The results of the simulations are plotted on a Lab color space, also known as an a*b* color map, shown in FIG. 3. Each data point shown in FIG. 3 provides a chroma and a hue for particular thickness of the dielectric layer for the multilayer structure depicted in FIG. 2A, the semiconductor absorber layer for the multilayer structure depicted in FIG. 2B or the dielectric layer for the multilayer structure depicted in FIG. 2C. Chroma can be defined as $C=\sqrt{(a^{*2}+b^{*2})}$ and hue can be defined as $\tan^{-1}(a^*/b^*)$. The hue can also be referred to as the angle relative to the positive a*-axis of a given data point. A hue value provides a measure of the color displayed by an object (e.g., red, green, blue, yellow etc.), and a chroma value provides a measure of the color's “brightness.” As shown in FIG. 3, the multilayer structure illustrated in FIG. 2A provides low chroma compared to the multilayer structures illustrated in FIGS. 2B and 2C. Accordingly, FIGS. 2A-2C and FIG. 3 demonstrate that an absorber layer is preferred over a dielectric layer as a first layer extending over a reflective core layer when colors with high chroma are desired. It should be understood that the Lab color space analysis shown in FIG. 3 is for illustrative purposes and that multilayer structures according to embodiments disclosed and described herein may have different Lab color space values. For instance, in embodiments, the multilayer structures could exhibit a blue, green, yellow, or other colors in the Lab color space.

Referring to FIGS. 4A-4C, chroma and hue as a function of layer thickness is depicted. Specifically, FIG. 4A graphically depicts the chroma and hue as a function of the thickness of the ZnS dielectric layer extending over the Al reflective core layer illustrated in FIG. 2A. FIG. 4B depicts the chroma and hue as a function of the thickness of the Si semiconductor absorber layer extending over the Al reflective core layer illustrated in FIG. 2B. FIG. 4C depicts the chroma and hue as a function of the thickness of the $Fe_2O_3$ dielectric layer extending over the Al reflective core layer illustrated in FIG. 2C. The dotted lines in FIGS. 4A-4C correspond to desired hue values between 10° and 30° on the Lab color space. FIGS. 4A-4C illustrate that higher chroma values within the hue range between 10° and 30° are achieved for multilayer structures having a dielectric layer extending across the reflective core layer. Again, it should be understood that the hue and chroma shown in FIG. 4A-4C is for illustrative purposes and that multilayer structures according to embodiments disclosed and described herein may have different hue and chroma values.

Referring again to FIG. 1, a multilayer structure 100 that reflects a color according to embodiments is shown. The multilayer structure 100 includes a core layer 110, a conformal dielectric layer 120 encapsulating the core layer 110, and a conformal absorber layer 130 encapsulating the conformal dielectric layer 120. As shown in FIG. 1, embodiments of multilayer structures disclosed and described herein comprise a conformal dielectric layer 120 and a conformal absorber layer 130. As used herein, “conformal” is used to indicate that the layer conforms to the size and shape of the layer to which it is deposited and encapsulates (i.e., is present on all sides) of the layer to which it is deposited. Although FIG. 1 shows a rectangular structure, this is for illustrative purposes only, and often the multilayer structure will have an asymmetric and non-uniform shape. In embodiments, the multilayer structure may be spherical or ovoid. It should be understood that embodiments may also include a multilayer structure with a conformal absorber encapsulating the core layer, and a conformal dielectric layer encapsulating the conformal absorber layer.

In embodiments, the core layer 110 can have a thickness that is greater than or equal to 20 nm and less than or equal to 100 μm, such as greater than or equal to 50 nm and less than or equal to 80 μm, greater than or equal to 75 nm and less than or equal to 60 μm, greater than or equal to 100 nm and less than or equal to 40 μm, greater than or equal to 125 nm and less than or equal to 20 μm, or greater than or equal to 150 nm and less than or equal to 1 μm. The core layer 110 can, in embodiments, have a thickness between 50 nm and 10 μm, such as between 100 nm and 10 μm, between 250 nm and 10 μm, between 500 nm and 10 μm, between 750 nm and 10 μm, between 1 μm and 10 μm, between 2 μm and 10 μm, between 5 μm and 10 μm, between 8 μm and 10 μm, between 50 nm and 8 μm, between 100 nm and 8 μm, between 250 nm and 8 μm, between 500 nm and 8 μm, between 750 nm and 8 μm, between 1 μm and 8 μm, between 2 μm and 8 μm, between 5 μm and 8 μm, between 50 nm and 5 μm, between 100 nm and 5 μm, between 250 nm and 5 μm, between 500 nm and 5 μm, between 750 nm and 5 μm, between 1 μm and 5 μm, between 2 μm and 5 μm, between 50 nm and 2 μm, between 100 nm and 2 μm, between 250 nm and 2 μm, between 500 nm and 2 μm, between 750 nm and 2 μm, between 1 μm and 2 μm, between 50 nm and 1 μm, between 100 nm and 1 μm, between 250 nm and 1 μm, between 500 nm and 1 μm, between 750 nm and 1 μm, between 50 nm and 750 nm, between 100 nm and 750 nm, between 250 nm and 750 nm, between 500 nm and 750 nm, between 50 nm and 500 nm, between 100 nm and 500 nm, between 250 nm and 500 nm, between 50 nm and 250 nm, between 100 nm and 250 nm, or between 50 nm and 100 nm.

In embodiments, the core layer 110 can be made from at least one of a "gray metallic" material, such as Al, Ag, Pt, Sn; at least one of a "colorful metallic" material, such as Au, Cu, brass, bronze, TiN, Cr, stainless steel, or a combination thereof. In one or more embodiments, the core layer 110 can be made from an oxide, such as alumina ($Al_2O_3$), silica ($SiO_2$), or glass materials. The core layer 110 can have plate-like shape or can be spherical or ovoid, as mentioned above.

According to one or more embodiments, the conformal dielectric layer 120 has a thickness that is greater than or equal to 5 nm and less than or equal to 500 nm, such as greater than or equal to 10 nm and less than or equal to 475 nm, greater than or equal to 10 nm and less than or equal to 450 nm, greater than or equal to 10 nm and less than or equal to 425 nm, greater than or equal to 10 nm and less than or equal to 400 nm, greater than or equal to 10 nm and less than or equal to 375 nm, greater than or equal to 10 nm and less than or equal to 350 nm, greater than or equal to 10 nm and less than or equal to 325 nm, or greater than or equal to 10 nm and less than or equal to 300 nm. The conformal dielectric layer 120 can, according to embodiments, have a thickness between 5 nm and 300 nm, such as between 10 nm and 300 nm, between 15 nm and 300 nm, between 25 nm and 300 nm, between 50 nm and 300 nm, between 75 nm and 300 nm, between 100 nm and 300 nm, between 125 nm and 300 nm, between 150 nm and 300 nm, between 175 nm and 300 nm, between 200 nm and 300 nm, between 225 nm and 300 nm, between 250 nm and 300 nm, between 275 nm and 300 nm, between 5 nm and 275 nm, between 10 nm and 275 nm, between 15 nm and 275 nm, between 25 nm and 275 nm, between 50 nm and 275 nm, between 75 nm and 275 nm, between 100 nm and 275 nm, between 125 nm and 275 nm, between 150 nm and 275 nm, between 175 nm and 275 nm, between 200 nm and 275 nm, between 225 nm and 275 nm, between 250 nm and 275 nm, between 5 nm and 250 nm, between 10 nm and 250 nm, between 15 nm and 250 nm, between 25 nm and 250 nm, between 50 nm and 250 nm, between 75 nm and 250 nm, between 100 nm and 250 nm, between 125 nm and 250 nm, between 150 nm and 250 nm, between 175 nm and 250 nm, between 200 nm and 250 nm, between 225 nm and 250 nm, between 5 nm and 225 nm, between 10 nm and 225 nm, between 15 nm and 225 nm, between 25 nm and 225 nm, between 50 nm and 225 nm, between 75 nm and 225 nm, between 100 nm and 225 nm, between 125 nm and 225 nm, between 150 nm and 225 nm, between 175 nm and 225 nm, between 200 nm and 225 nm, between 5 nm and 200 nm, between 10 nm and 200 nm, between 15 nm and 200 nm, between 25 nm and 200 nm, between 50 nm and 200 nm, between 75 nm and 200 nm, between 100 nm and 200 nm, between 125 nm and 200 nm, between 150 nm and 200 nm, between 175 nm and 200 nm, between 5 nm and 175 nm, between 10 nm and 175 nm, between 15 nm and 175 nm, between 25 nm and 175 nm, between 50 nm and 175 nm, between 75 nm and 175 nm, between 100 nm and 175 nm, between 125 nm and 175 nm, between 150 nm and 175 nm, between 5 nm and 150 nm, between 10 nm and 150 nm, between 15 nm and 150 nm, between 25 nm and 150 nm, between 50 nm and 150 nm, between 75 nm and 150 nm, between 100 nm and 150 nm, between 125 nm and 150 nm, between 5 nm and 100 nm, between 10 nm and 100 nm, between 15 nm and 100 nm, between 25 nm and 100 nm, between 50 nm and 100 nm, between 75 nm and 100 nm, between 5 nm and 75 nm, between 10 nm and 75 nm, between 15 nm and 75 nm, between 25 nm and 75 nm, between 50 nm and 75 nm, between 5 nm and 50 nm, between 10 nm and 50 nm, between 15 nm and 50 nm, between 25 nm and 50 nm, between 5 nm and 25 nm, between 10 nm and 25 nm, between 15 nm and 25 nm, between 5 nm and 15 nm, between 10 nm and 15 nm, or between 5 nm and 10 nm.

The conformal dielectric layer 120 is, in embodiments, a high refractive index material, such as $TiO_2$ (including anatase, rutile, or amorphous $TiO_2$ and mixtures thereof), ZnS, $ZrO_2$, $HfO_2$, $Fe_3O_4$, or AlAs. In one or more embodiments, the conformal dielectric layer 120 may be made from high refractive index absorptive dielectric materials such as $Fe_2O_3$, PbS, GaAs, or InAs. In embodiments, the conformal dielectric layer may be made from a low refractive index material, such as $SiO_2$, $MgF_2$, KBr, ZnO, or $Al_2O_3$. The conformal dielectric layer 120 can, in embodiments, be deposited to encapsulate the core layer 110 by CVD, PVD, wet chemical methods, or ALD.

As shown in FIG. 1, a conformal absorber layer 130 encapsulates the conformal dielectric layer 120. The location of the conformal absorber layer 130 is chosen to increase the absorption of target light wavelengths. For instance, if the multilayer structure is to be configured to absorb electromagnetic radiation having wavelengths that are less than or equal to 550 nm but reflect electromagnetic radiation with wavelengths of approximately 650 nm, such as visible light outside of the hue between 10° and 30°, the absorber layer is placed at a thickness where the electric field ($|E|^2$) is less at the 550 nm wavelength than at the 650 nm wavelength. Mathematically, this can be expressed as:

$$|E_{550}|^2 \ll |E_{650}|^2 \quad (1)$$

and preferably:

$$|E_{650}|^2 \approx 0 \quad (2)$$

Figure 5:
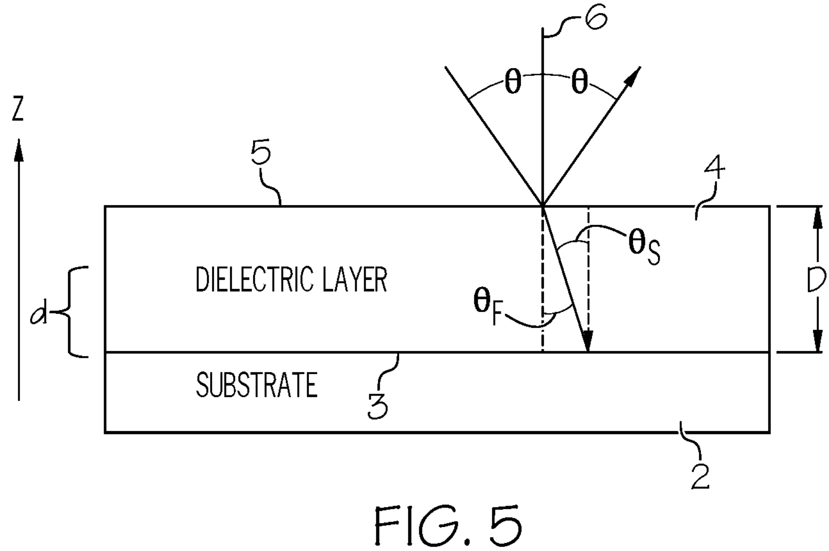
FIG. 5 depicts a multilayer structure with a dielectric layer extending over a substrate layer and exposed to electromagnetic radiation at an angle θ relative to a normal direction to the outer surface of the dielectric layer.

FIG. 5 and the following discussion provide a method for calculating the thickness of a zero or near-zero electric field point at a given wavelength of light, according to embodiments. For the purposes of the present specification, the term "near-zero" is defined $|E|^2 \leq 10$. FIG. 5 illustrates a multilayer structure with a dielectric layer 4 having a total thickness "D", an incremental thickness "d" and an index of refraction "n" on a substrate layer 2 having an index of refraction "$n_s$". The substrate layer 2 can be a core layer or a reflective core layer of a multilayer structure. Incident light strikes the outer surface 5 of the dielectric layer 4 at angle θ relative to line 6, which is perpendicular to the outer surface 5, and reflects from the outer surface 5 at the same angle θ. Incident light is transmitted through the outer surface 5 and into the dielectric layer 4 at an angle $\theta_F$ relative to the line 6 and strikes the surface 3 of substrate layer 2 at an angle $\theta_s$. For a single dielectric layer, $\theta_s=\theta_F$ and the energy/electric field (E) can be expressed as E(z) when z=d. From Maxwell's equations, the electric field can be expressed for s polarization as:

$$\vec{E}(d)=\{u(z),\,0,\,0\}\ \exp\ (ik\alpha y)\Big|_{z=d} \tag{3}$$

and for p polarization as:

$$\vec{E}(d)=\left\{0,\,u(z),\,-\frac{\alpha}{\tilde{\varepsilon}(z)}v(z)\right\}\exp\,(ik\alpha y)|_{z=d} \tag{4}$$

where $$k=\frac{2\pi}{\lambda},\,\lambda$$

is a desired wavelength to be reflected, $\alpha=n_s \sin\theta_s$ where "s" corresponds to the substrate in FIG. 5, and ε(z) is the permittivity of the layer as a function of z. As such:

$$|E(d)|^2=|u(z)|^2\ \exp\ (2ik\alpha y)\Big|_{z=d} \tag{5}$$

for s polarization, and $$|E(d)|^2=\left[|u(z)|^2+\left|\frac{\alpha}{\sqrt{n}}v(z)\right|^2\right]\exp\,(2ik\alpha y)\Bigg|_{z=d} \tag{6}$$

for p polarization.

It should be appreciated that variation of the electric field along the Z direction of the dielectric layer 4 can be estimated by calculation of the unknown parameters u(z) and v(z), where it can be shown that:

$$\begin{pmatrix}u\\v\end{pmatrix}_{z=d}=\begin{pmatrix}\cos\varphi & (i/q)\sin\varphi\\ iq\sin\varphi & \cos\varphi\end{pmatrix}\begin{pmatrix}u\\v\end{pmatrix}_{z=0,substrate} \tag{7}$$

where 'i' is the square root of −1. Using the boundary conditions $u|_{z=0}=1$, $v|_{z=0}=q_s$, and the following relations:

$$q_s=n_s\ \cos\ \theta_s\ \text{ for } s-\text{polarization} \tag{8}$$

$$q_s=n_s/\cos\ \theta_s\ \text{ for } p-\text{polarization} \tag{9}$$

$$q=n\ \cos\ \theta_F\ \text{ for } s-\text{polarization} \tag{10}$$

$$q=n/\cos\ \theta_F\ \text{ for } p-\text{polarization} \tag{11}$$

$$\varphi=k\cdot n\cdot d\ \cos\ (\theta_F) \tag{12}$$

u(z) and v(z) can be expressed as:

$$\begin{aligned}u(z)|_{z=d}&=u\,|_{z=0}\cos\varphi+v|_{z=o}\left(\frac{1}{q}\sin\varphi\right)\\&=\cos\varphi+\frac{i.q_s}{q}\sin\varphi\end{aligned} \tag{13}$$

and $$\begin{aligned}v(z)|_{z=d}&=iqu|_{z=0}\sin\varphi+v|_{z=0}\cos\varphi\\&=iq\sin\varphi+q_s\cos\varphi\end{aligned} \tag{14}$$

Therefore:

$$\begin{aligned}|E(d)|^2&=\left[\cos^2\varphi+\frac{q_s^2}{q^2}\sin^2\varphi\right]e^{2ik\alpha\gamma}\\&=\left[\cos^2\varphi+\frac{n_s^2}{n^2}\sin^2\varphi\right]e^{2ik\alpha\gamma}\end{aligned} \tag{15}$$

for s polarization with $\varphi=k\cdot n\cdot d\cos(\theta_F)$, and:

$$\begin{aligned}|E(d)|^2&=\left[\cos^2\varphi+\frac{n_s^2}{n^2}\sin^2\varphi+\frac{\alpha^2}{n}\left(q_s^2\cos^2\varphi+q^2\sin^2\varphi\right)\right]\\&=\left[\left(1+\frac{\alpha^2q_s^2}{n}\right)\cos^2\varphi+\left(\frac{n_s^2}{n^2}+\frac{\alpha^2q^2}{n}\right)\sin^2\varphi\right]\end{aligned} \tag{16}$$

for p polarization where:

$$\alpha=n_s\sin\theta_s=n\sin\theta_F \tag{17}$$

$$q_s=\frac{n_s}{\cos\theta_s} \tag{18}$$

and $$q_s=\frac{n}{\cos\theta_F} \tag{19}$$

Thus for a simple situation where $\theta_F=0$ or normal incidence, $\varphi=k\cdot n\cdot d$, and $\alpha=0$:

$$|E(d)|^2\ \text{ for } s-\text{polarization}= \tag{20}$$

$$|E(d)|^2\ \text{ for } p-\text{polarization}=\left[\cos^2\varphi+\frac{n_s^2}{n^2}\sin^2\varphi\right]$$

$$=\left[\cos^2(k\cdot n\cdot d)+\frac{n_s^2}{n^2}\sin^2(k\cdot n\cdot d)\right] \tag{21}$$

which allows for the thickness "d" to be solved for (i.e., the position or location within the dielectric layer where the electric field is zero). It should be appreciated that the thickness "d" can be the thickness of the conformal dielectric layer 120 extending over the core layer 110 that provides a zero or near zero electric field at the interface between the conformal dielectric layer 120 and the conformal absorber layer 130. It should also be appreciated that the thickness "d" can also be the thickness of the dielectric outer layer 140 extending over the conformal absorber layer 130 that provides a zero or near zero electric field at the interface between the dielectric outer layer and the conformal absorber layer 130, depending on the thickness "d" where the electric field is zero or near-zero.

In embodiments, the conformal absorber layer has a thickness that is from greater than or equal to 2 nm and less than or equal to 50 nm, such as greater than or equal to 2 nm and less than or equal to 45 nm, greater than or equal to 2 nm and less than or equal to 40 nm, greater than or equal to 2 nm and less than or equal to 35 nm, greater than or equal to 2 nm and less than or equal to 30 nm, or greater than or equal to 2 nm and less than or equal to 25 nm. The conformal absorber layer 130 can, in embodiments, have a thickness between 2 nm and 20 nm, such as between 5 nm and 20 nm, between 8 nm and 20 nm, between 10 nm and 20 nm, between 12 nm and 20 nm, between 15 nm and 20 nm, between 18 nm and 20 nm, between 2 nm and 18 nm, between 5 nm and 18 nm, between 8 nm and 18 nm, between 10 nm and 18 nm, between 12 nm and 18 nm, between 15 nm and 18 nm, between 2 nm and 15 nm, between 5 nm and 15 nm, between 8 nm and 15 nm, between 10 nm and 15 nm, between 12 nm and 15 nm, between 2 nm and 12 nm, between 5 nm and 12 nm, between 8 nm and 12 nm, between 10 nm and 12 nm, between 2 nm and 10 nm, between 5 nm and 10 nm, between 8 nm and 10 nm, between 2 nm and 8 nm, between 5 nm and 8 nm, or between 2 nm and 5 nm.

In embodiments, the conformal absorber layer 130 can be made from at least a material selected from W, Cr, Ge, Ni, stainless steel, Pd, Ti, Si, V, TiN, Co, Mo, Nb, ferric oxide, or combinations thereof. In one or more embodiments, the conformal absorber layer 130 is comprised of W. In embodiments, ALD is used to deposit the conformal absorber layer 130 because ALD allows uniform deposition of materials at the thicknesses desired. Other deposition methods have difficulty depositing uniform layers at thicknesses of 20 nm and below.

In one or more embodiments, each of the core layer 110, the first conformal dielectric layer 120, the conformal absorber layer 130, and the second conformal dielectric layer 140 individually has a pore volume that is less than or equal to 0.030 $cm^3/g$, such as less than or equal to 0.025 $cm^3/g$, less than or equal to 0.020 $cm^3/g$, or less than or equal to 0.015 $cm^3/g$. In embodiments, each of the core layer 110, the conformal dielectric layer 120, and the conformal absorber layer 130, individually has a pore volume that is less than or equal to 0.010 $cm^3/g$, such as less than or equal to 0.009 $cm^3/g$, less than or equal to 0.008 $cm^3/g$, less than or equal to 0.007 $cm^3/g$, less than or equal to 0.006 $cm^3/g$, less than or equal to 0.005 $cm^3/g$ pore volume, less than or equal to 0.004 $cm^3/g$, less than or equal to 0.003 $cm^3/g$, less than or equal to 0.002 $cm^3/g$, less than or equal to 0.001 $cm^3/g$. It should be understood that in embodiments one or more of the core layer 110, the conformal dielectric layer 120, and the conformal absorber layer 130, may have the same pore volume and in other embodiments one or more of the core layer 110, the conformal dielectric layer 120, and the conformal absorber layer 130 may have different pore volume.

In one or more embodiments the surface area of the each of the core layer 110, the first conformal dielectric layer 120, the conformal absorber layer 130, and the second conformal dielectric layer 140 individually is less than or equal to 100 square meters per gram ($m^2/g$), such as less than or equal to 90 $m^2/g$, less than or equal to 85 $m^2/g$, less than or equal to 80 $m^2/g$, less than or equal to 75 $m^2/g$, less than or equal to 70 $m^2/g$, less than or equal to 65 $m^2/g$, less than or equal to 60 $m^2/g$, less than or equal to 55 $m^2/g$, less than or equal to 50 $m^2/g$, less than or equal to 45 $m^2/g$, less than or equal to 40 $m^2/g$, less than or equal to 35 $m^2/g$, less than or equal to 30 $m^2/g$, less than or equal to 25 $m^2/g$, less than or equal to 20 $m^2/g$, or less than or equal to 15 $m^2/g$. The surface area, in embodiments, of the each of the core layer 110, the conformal dielectric layer 120, and the conformal absorber layer 130 individually is less than or equal to 10 $m^2/g$, such as less than or equal to 9 $m^2/g$, less than or equal to 8 $m^2/g$, less than or equal to 7 $m^2/g$, less than or equal to 6 $m^2/g$, less than or equal to 5 $m^2/g$, less than or equal to 4 $m^2/g$, less than or equal to 3 $m^2/g$, less than or equal to 2 $m^2/g$, or less than or equal to 1 $m^2/g$. Accordingly, in embodiments, each of the layers may individually have a surface area from 2 $m^2/g$ to 10 $m^2/g$, from 3 $m^2/g$ to 10 $m^2/g$, from 3 $m^2/g$ to 8 $m^2/g$, from 5 $m^2/g$ to 8 $m^2/g$, from 1 $m^2/g$ to 3 $m^2/g$, from 3 $m^2/g$ to 5 $m^2/g$, from 2 $m^2/g$ to 3 $m^2/g$, from 1 $m^2/g$ to 2 $m^2/g$, or from 0.5 $m^2/g$ to 1 $m^2/g$. The surface area is measured by collecting full adsorption/desorption isotherms over samples, after degassing at 90° C. for one hour, and degassing to 150° C. for three hours. It should be understood that in embodiments one or more of the core layer 110, the conformal dielectric layer 120, and the conformal absorber layer 130 may have the same surface area and in other embodiments one or more of the core layer 110, the conformal dielectric layer 120, and the conformal absorber layer 130 may have different surface areas.

The isotherms were collected using nitrogen physisorption at 76 K to obtain the specific surface area (SSA) of the materials, by fitting 13 points collected from $P/P_0 \approx 0.06$-0.3 to the Brunauer-Emmett-Teller (BET) equation. Additional adsorption points were collected at various $P/P_0$, up to $P/P_0 \approx 0.95$, followed by desorption back to $P/P_0 \approx 0.06$. The total pore volume was determined by the volume of nitrogen adsorbed at $P/P_0$ 0.95, and average pore diameter was calculated using the Barrett Joyner Halenda (BJH) method.

In embodiments, the multilayer structure may have a $D_{50}$ diameter measured by the BET equation the amount of adsorbed gas, which build up one monolayer on the surface, can be calculated from the measured isotherm. The amount of molecules in this monolayer multiplied by the required space of one molecule gives the BET $D_{50}$ that is from 1 μm to 500 μm, such as from 10 μm to 500 μm, from 20 μm to 500 μm, from 25 μm to 500 μm, from 50 μm to 500 μm, from 100 μm to 500 μm, from 150 μm to 500 μm, from 200 μm to 500 μm, from 250 μm to 500 μm, from 300 μm to 500 μm, from 350 μm to 500 μm, from 400 μm to 500 μm, from 450 μm to 500 μm, from 5 μm to 450 μm, from 10 μm to 450 μm, from 20 μm to 450 μm, from 25 μm to 450 μm, from 50 μm to 450 μm, from 100 μm to 450 μm, from 150 μm to 450 μm, from 200 μm to 450 μm, from 250 μm to 450 μm, from 300 μm to 450 μm, from 350 μm to 450 μm, from 400 μm to 450 μm, from 5 μm to 400 μm, from 10 μm to 400 μm, from 20 μm to 400 μm, from 25 μm to 400 μm, from 50 μm to 400 μm, from 100 μm to 400 μm, from 150 μm to 400 μm, from 200 μm to 400 μm, from 250 μm to 400 μm, from 300 μm to 400 μm, from 350 μm to 400 μm, from 5 μm to 350 μm, from 10 μm to 350 μm, from 20 μm to 350 μm, from 25 μm to 350 μm, from 50 μm to 350 μm, from 100 μm to 350 μm, from 150 μm to 350 μm, from 200 μm to 350 μm, from 250 μm to 350 μm, from 300 μm to 350 μm, from 5 μm to 300 μm, from 10 μm to 300 μm, from 20 μm to 300 μm, from 25 μm to 300 μm, from 50 μm to 300 μm, from 100 μm to 300 μm, from 150 μm to 300 μm, from 200 μm to 300 μm, from 250 μm to 300 μm, from 5 μm to 250 μm, from 10 μm to 250 μm, from 20 μm to 250 μm, from 25 μm to 250 μm, from 50 μm to 250 μm, from 100 μm to 250 μm, from 150 μm to 250 μm, from 200 μm to 250 μm, from 5 μm to 200 μm, from 10 μm to 200 μm, from 20 μm to 200 μm, from 25 μm to 200 μm, from 50 μm to 200 μm, from 100 μm to 200 μm, from 150 μm to 200 μm, from 5 μm to 150 μm, from 10 μm to 150 μm, from 20 μm to 150 μm, from 25 μm to 150 μm, from 50 μm to 150 μm, from 100 μm to 150 μm, from 5 μm to 100 μm, from 10 μm to 100 μm, from 20 μm to 100 μm, from 25 μm to 100 μm, from 50 μm to 100 μm, from 5 μm to 50 μm, from 10 μm to 50 μm, from 20 μm to 50 μm, from 25 μm to 50 μm, from 5 μm to 25 μm, from 10 μm to 25 μm, from 20 μm to 25 μm, from 5 μm to 20 μm, from 10 μm to 20 μm, or from 5 μm to 10 μm.

The aspect ratio of the multilayer structures according to embodiments disclosed and described herein is from 1 to 100 as measure by electron microscope (TEM, SEM), with both cross-section and surface being measured, based on a large population of flakes, such as from 5 to 100, from 10 to 100, from 20 to 100, from 30 to 100, from 40 to 100, from 50 to 100, from 60 to 100, from 70 to 100, from 80 to 100, from 90 to 100, from 5 to 90, from 10 to 90, from 20 to 90, from 30 to 90, from 40 to 90, from 50 to 90, from 60 to 90, from 70 to 90, from 80 to 90, from 5 to 80, from 10 to 80, from 20 to 80, from 30 to 80, from 40 to 80, from 50 to 80, from 60 to 80, from 70 to 80, from 5 to 70, from 10 to 70, from 20 to 70, from 30 to 70, from 40 to 70, from 50 to 70, from 60 to 70, from 5 to 60, from 10 to 60, from 20 to 60, from 30 to 60, from 40 to 60, from 50 to 60, from 5 to 50, from 10 to 50, from 20 to 50, from 30 to 50, from 40 to 50, from 5 to 40, from 10 to 40, from 20 to 40, from 30 to 40, from 10 to 40, from 20 to 40, from 30 to 40, from 5 to 30, from 10 to 30, from 20 to 30, from 5 to 20, from 10 to 20, or from 5 to 10.

Embodiments of the multilayer structure 100 described above have a hue shift of less than 30°, such as less than 25°, less than 20°, less than 15°, or less than 10° in the Lab color space when viewed at angles from 0° to 45°.

In one or more embodiments, the multilayer structure 100 comprises a reflective core layer 110 made from Al, a conformal dielectric layer 120 deposited by ALD and made from $TiO_2$ encapsulating the reflective core layer 110, and a conformal metallic absorber layer 130 deposited by ALD and made from W encapsulating the conformal dielectric layer 120.

In one or more embodiments, the multilayer structure 100 comprises a reflective core layer 110 made from Al, a conformal dielectric layer 120 deposited by ALD and made from $Fe_2O_3$ encapsulating the reflective core layer 110, and a conformal metallic absorber layer 130 deposited by ALD and made from W encapsulating the conformal dielectric layer 120.

The multilayer structures in embodiments disclosed herein can be used as pigments (e.g., paint pigments for a paint used to paint an object), or a continuous structure applied to an object. When used as pigments, at least one of paint binders and fillers can be used and mixed with the pigments to provide a paint that displays an omnidirectional structural color. In addition, other additives may be added to the multilayer structure to aid the compatibility of multilayer structure in the paint system. Exemplary compatibility-enhancing additives include silane surface treatments that coat the exterior of the multilayer structure and improve the compatibility of multilayer structure in the paint system. Such paint systems or films can be used on any article, including an automotive vehicle.

As mentioned herein at least one of the metal or metal oxide layer (such as the conformal dielectric layer and the conformal absorber layer) may be deposited by ALD. Embodiments of ALD processes for depositing these layers will be discussed in more detail below.

In addition, using an ALD process allows the deposition of multiple layers with optical precision and a vast difference in material properties (such as dielectric materials vs. metallic materials as described above) at a large scale. Moreover, ALD processes allow for production of multilayer structures with high density, low porosity, and complete layer coverage all with nanometer-scale precision. And, the deposition precision and non-destructive features of ALD have little impact on the existing vulnerable layer(s) (e.g., an Al core layer and the like). Such results are difficult or costly to achieve in other processes.

A first aspect includes, a multilayer structure that reflects color comprising: a core layer; a conformal dielectric layer encapsulating the core layer; and a conformal absorber layer encapsulating the conformal dielectric layer, wherein the multilayer structure consists of three optical layers.

A second aspect includes, a multilayer structure according to the first aspect, wherein the multilayer structure reflects a single narrow band of visible light when exposed to broadband electromagnetic radiation, the single narrow band of visible light comprising: a color shift of the single narrow band of visible light is less than 30° measured in Lab color space when the multilayer structure is exposed to broadband electromagnetic radiation and viewed from angles between 0° and 45° relative to a direction normal to an outer surface of the multilayer structure.

A third aspect includes a multilayer structure of the first or second aspect, wherein the core layer is formed from Al, Ag, Pt, Sn, Au, Cu, brass, bronze, stainless steel, TiN, Cr, $Al_2O_3$, $SiO_2$, glass or combinations thereof.

A fourth aspect includes a multilayer structure according to the first to third aspects, wherein the core layer has a thickness between 20 nm and 100 μm.

A fifth aspect includes a multilayer structure according to the first to fourth aspects, wherein the conformal dielectric layer is formed from $TiO_2$, ZnS, $ZrO_2$, $HfO_2$, $Fe_3O_4$, AlAs, $Fe_2O_3$, PbS, GaAs, InAs, $SiO_2$, $MgF_2$, KBr, ZnO, $Al_2O_3$, and combinations thereof.

A sixth aspect includes a multilayer structure according to the first to fifth aspects, wherein the conformal dielectric layer has a thickness between 5 nm and 500 nm.

A seventh aspect includes a multilayer structure according to the first to sixth aspects, wherein the conformal absorber layer is formed from W, Cr, Ge, Ni, stainless steel, Pd, Ti, Si, V, TiN, Co, Mo, Nb, ferric oxide, or combinations thereof.

An eighth aspect includes a multilayer structure according to the first to seventh aspects, wherein the conformal absorber layer has a thickness between 2 nm and 50 nm.

A ninth aspect includes a multilayer structure according to the first to eighth aspects, wherein the core layer is formed from Al, the conformal dielectric layer is formed from $TiO_2$, and the conformal absorber layer is formed from W.

A tenth aspect includes a multilayer structure according to the first to eighth aspects, wherein the core layer is formed from Al, the conformal dielectric layer is formed from $Fe_2O_3$, and the conformal absorber layer is formed from W.

An eleventh aspect includes a multilayer structure according to the first to tenth aspects, wherein each of the core layer, the conformal dielectric layer, and the conformal absorber layer individually has a pore volume that is less than or equal to 0.030 $cm^3/g$.

A twelfth aspect includes a multilayer structure according to the first to eleventh aspects, wherein each of the core layer, the conformal dielectric layer, and the conformal absorber layer individually has a pore volume that is less than or equal to 0.005 $cm^3/g$.

A thirteenth aspect includes a multilayer structure according to the first to twelfth aspects, wherein each of the core layer, the conformal dielectric layer, and the conformal absorber layer individually has a surface area less than or equal to 100 $m^2/g$.

A fourteenth aspect includes a multilayer structure according to the first to thirteenth aspects, wherein each of the core layer, the conformal dielectric layer, and the conformal absorber layer individually has a surface area less than or equal to 5 $m^2/g$.

A fifteenth aspect includes a multilayer structure according to the first to fourteenth aspects, wherein the multilayer structure has a $D_{50}$ diameter that is from 1 μm to 500 μm.

A sixteenth aspect includes a multilayer structure according to the first to fifteenth aspects, wherein the multilayer structure has an aspect ratio from 1 to 100.

A seventeenth aspect a method for forming the multilayer structure of first to sixteenth aspects, the method comprising: depositing the conformal dielectric layer onto the core layer by CVD or ALD; and depositing the conformal absorber layer onto the conformal dielectric layer by ALD.

An eighteenth aspect includes a method for forming the multilayer structure of the first to sixteenth aspects, the method comprising: depositing the conformal dielectric layer onto the core layer by ALD; and depositing the conformal absorber layer onto the conformal dielectric layer by ALD.

A nineteenth aspect includes a paint system comprising: a binder; and a multilayer structure of any of the first to sixteenth aspects.

A twentieth aspect includes an automotive vehicle comprising the paint system of the nineteenth aspect.

It is noted that the terms “substantially” and “about” may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

EXAMPLES

Embodiments will be further clarified by the following examples.

Example 1

Multilayer structures formed by an ALD process deposit distinct and deposited as smooth layers for each layer in the three-layer multilayer structure.

Example 2

A comparison of a $TiO_2$ dielectric layer deposited by the ALD process of Example 1 is compared to a $TiO_2$ dielectric layer formed by wet chemical processes.

The pigments were suspended in isopropyl alcohol (IPA) in a flask at 40° C. A solution of titanium ethoxide dissolved in IPA was titrated at constant rate for 2.5 hours. At the same time, DI water diluted in IPA is metered in. After the titration, the suspension was stirred for another 30 minutes. The mixture was allowed to cool to room temperature, then filtered off, washed with IPA and dried at 100° C. for 24 hours. Then the collected product was allowed to sinter at 300-500° C. for a period of 2-6 hours.

The dielectric layer deposited by the ALD process of Example 1 was much more smooth and dense than the dielectric layer formed by wet chemical methods.

Example 3

Figure 6A:
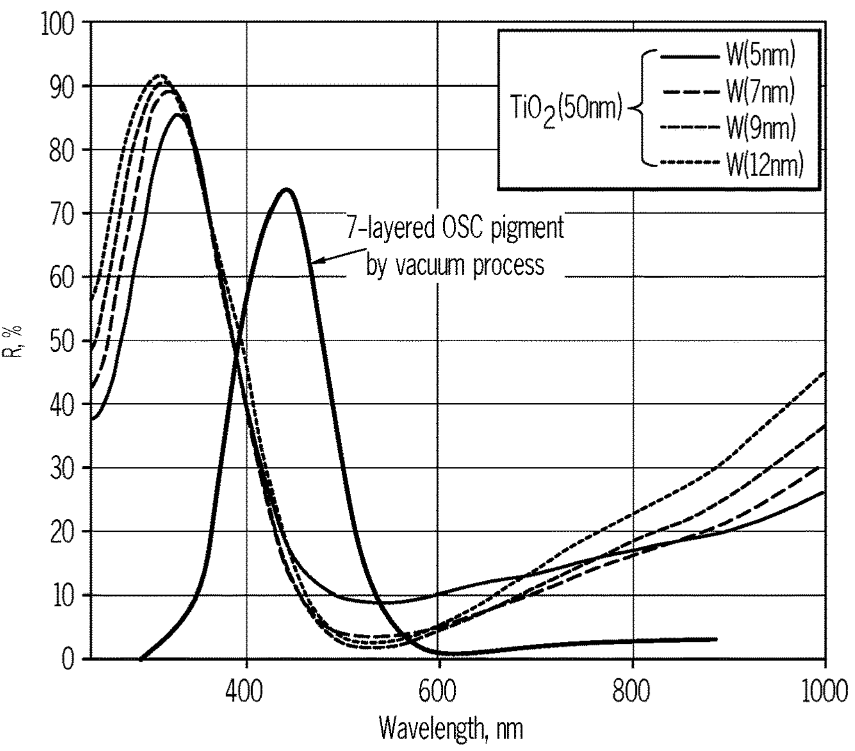
FIG. 6A is a graph of reflectance versus wavelength of electromagnetic radiation that shows the effect of the thickness of a tungsten absorber layer.

The effects of the thicknesses for tungsten metallic absorber layers and $TiO_2$ dielectric layers were studied in this example. FIG. 6A shows four samples made according to the ALD process of Example 1, except that the process was modified to provide tungsten metallic absorber layers with thickness of 5 nm, 7 nm, 9 nm, and 12 nm. All of these samples had an Al reflective core layer and a 50 nm thick $TiO_2$ dielectric layer. As shown in FIG. 6A, as the thickness of the tungsten layer increased, the reflectance curve shifted slightly to the left (lower wavelengths) and became more reflective.

Figure 6B:
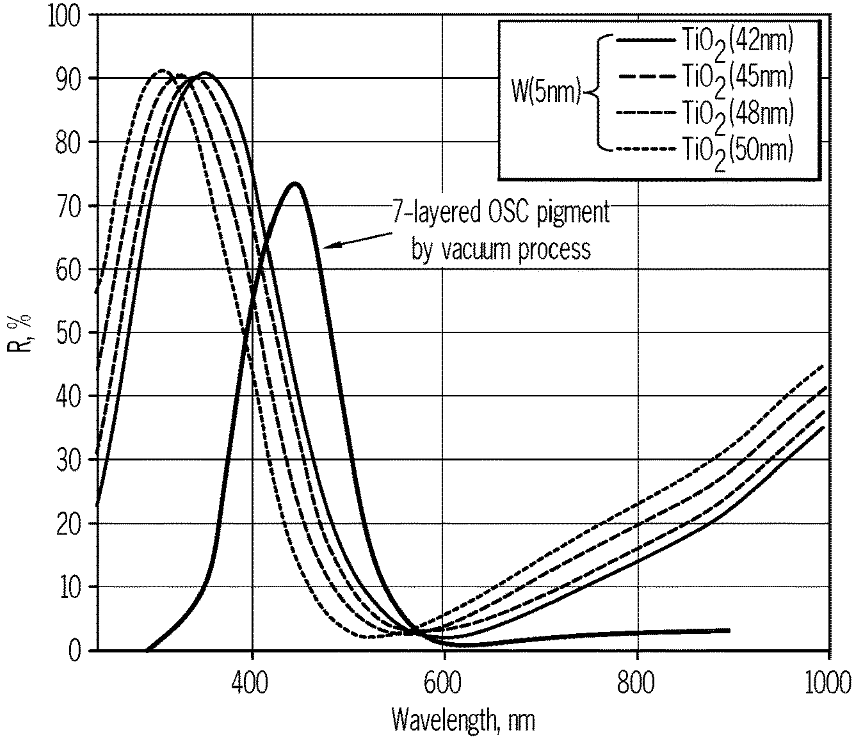
FIG. 6B is a graph of reflectance versus wavelength of electromagnetic radiation that shows the effect of the thickness of a $TiO_2$ dielectric layer.

FIG. 6B shows four samples made according to the ALD process of Example 1, except that the process was modified to provide $TiO_2$ dielectric layers with thickness of 42 nm, 45 nm, 48 nm, and 50 nm. All of these samples had an Al reflective core layer and a 5 nm thick tungsten metallic absorber layer. As shown in FIG. 6B, as the thickness of the titanium dioxide layer increased, the reflectance curve shifted slightly to the left (lower wavelengths). However, each of the samples performed significantly better than a seven layer structure formed by vacuum deposition.

Example 4

This example compares the density, surface area, and pore volumes of multilayer structures made according to the ALD process of Example 1 and a wet chemical method as described in Example 2. As shown in Table 1 below, the density of the multilayer structures made by the ALD and wet chemical methods were the same, but surface area of the multilayer structure was much smaller using the ALD method.

TABLE 1

| Property | ALD Method | Wet Chem. Method |
|---|---|---|
| Density | 2.8 $g/cm^3$ | 2.8 $g/cm^3$ |
| Surface Area (BET) | 3.6 $m^2/g$ | 109.2 $m^2/g$ |
| Pore Volume (BET) | 0.005 $cm^3/g$ | 0.036 $cm^3/g$ |

The density of the pigment is the ratio of the mass of the pigment sample and its volume including the contribution of the interparticulate void volume. To measure this, a glass cylinder with specific volume was used and known mass of pigments were introduced into the cylinder. The volume was estimated by addition of DI water into the cylinder until the water reach the volume line of cylinder. By measuring the weight of how much DI water was added, the volume of water was obtained. The sample volume was obtained by subtracting the volume of water with total volume of cylinder. Replicate experiments were performed for the determination of the density. Full adsorption/desorption isotherms were collected over samples, after degassing at 90° C. for one hour, and then degassing at 150° C. for three hours. The isotherms were collected using nitrogen physisorption at 76 K to obtain the specific surface area (SSA) of the materials, by fitting 13 points collected from $P/P_0 \approx 0.06$-0.3 to the Brunauer-Emmett-Teller (BET) equation. Additional adsorption points were collected at various $P/P_0$, up to $P/P_0 \approx 0.95$, followed by desorption back to $P/P_0 \approx 0.06$. The total pore volume was determined by the volume of nitrogen adsorbed at $P/P_0$ 0.95, and average pore diameter was calculated using the Barrett Joyner Halenda (BJH) method.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A multilayer structure that reflects color comprising:

a core layer;

a conformal dielectric layer encapsulating the core layer, the conformal dielectric layer having a thickness between 5 nm and 500 nm; and a conformal absorber layer encapsulating the conformal dielectric layer, the conformal absorber layer having a thickness between 2 nm and 50 nm, wherein each of the core layer, the conformal dielectric layer, and the conformal absorber layer individually has a surface area less than or equal to 100 $m^2/g$, and wherein the multilayer structure consists of three optical layers, the multilayer structure reflects a single narrow band of visible light when exposed to broadband electromagnetic radiation, the single narrow band of visible light comprising:

a color shift of the single narrow band of visible light is less than 30° measured in Lab color space when the multilayer structure is exposed to broadband electromagnetic radiation and viewed from angles between 0° and 45° relative to a direction normal to an outer surface of the multilayer structure.

2. The multilayer structure of claim 1, wherein the core layer is formed from Al, Ag, Pt, Sn, Au, Cu, brass, bronze, stainless steel, TiN, Cr, $Al_2O_3$, $SiO_2$, glass or combinations thereof.

3. The multilayer structure of claim 1, wherein the core layer has a thickness between 20 nm and 100 μm.

4. The multilayer structure of claim 1, wherein the conformal dielectric layer is formed from $TiO_2$, ZnS, $ZrO_2$, $HfO_2$, $Fe_3O_4$, AlAs, $Fe_2O_3$, PbS, GaAs, InAs, $SiO_2$, $MgF_2$, KBr, ZnO, $Al_2O_3$, and combinations thereof.

5. The multilayer structure of claim 1, wherein the conformal absorber layer is formed from W, Cr, Ge, Ni, stainless steel, Pd, Ti, Si, V, TiN, Co, Mo, Nb, ferric oxide, or combinations thereof.

6. The multilayer structure of claim 1, wherein the core layer is formed from Al, the conformal dielectric layer is formed from $TiO_2$, and the conformal absorber layer is formed from W.

7. The multilayer structure of claim 1, wherein the core layer is formed from Al, the conformal dielectric layer is formed from $Fe_2O_3$, and the conformal absorber layer is formed from W.

8. The multilayer structure of claim 1, wherein each of the core layer, the conformal dielectric layer, and the conformal absorber layer individually has a pore volume that is less than or equal to 0.030 $cm^3/g$.

9. The multilayer structure of claim 1, wherein each of the core layer, the conformal dielectric layer, and the conformal absorber layer individually has a pore volume that is less than or equal to 0.005 $cm^3/g$.

10. The multilayer structure of claim 1, wherein each of the core layer, the conformal dielectric layer, and the conformal absorber layer individually has a surface area less than or equal to 5 $m^2/g$.

11. The multilayer structure of claim 1, wherein the multilayer structure has a $D_{50}$ diameter that is from 1 μm to 500 μm.

12. The multilayer structure of claim 1, wherein the multilayer structure has an aspect ratio from 1 to 100.

13. A method for forming a multilayer structure comprising a core layer, a conformal dielectric layer, and a dielectric layer, the method comprising:

depositing the conformal dielectric layer onto the core layer by chemical vapor deposition (CVD) or atomic layer deposition (ALD), wherein the conformal dielectric layer has a thickness between 5 nm and 500 nm; and depositing the conformal absorber layer onto the conformal dielectric layer by ALD, wherein the conformal absorber layer has a thickness between 2 nm and 50 nm, wherein the multilayer structure consists of three optical layers, the multilayer structure reflects a single narrow band of visible light when exposed to broadband electromagnetic radiation, the single narrow band of visible light comprising:

a color shift of the single narrow band of visible light is less than 30° measured in Lab color space when the multilayer structure is exposed to broadband electromagnetic radiation and viewed from angles between 0° and 45° relative to a direction normal to an outer surface of the multilayer structure.

14. A method for forming the multilayer structure of claim 13, the method comprising:

depositing the conformal dielectric layer onto the core layer by ALD; and depositing the conformal absorber layer onto the conformal dielectric layer by ALD.

15. A paint system comprising:

a binder; and a multilayer structure of claim 1.

16. An automotive vehicle comprising the paint system of claim 15.

17. A multilayer structure that reflects color comprising:

a core layer;

a conformal dielectric layer encapsulating the core layer, the conformal dielectric layer having a thickness between 5 nm and 500 nm; and a conformal absorber layer encapsulating the conformal dielectric layer, the conformal absorber layer having a thickness between 2 nm and 50 nm, wherein each of the core layer, the conformal dielectric layer, and the conformal absorber layer individually has a pore volume that is less than or equal to 0.030 $cm^3/g$, and wherein the multilayer structure consists of three optical layers, the multilayer structure reflects a single narrow band of visible light when exposed to broadband electromagnetic radiation, the single narrow band of visible light comprising:

a color shift of the single narrow band of visible light is less than 30° measured in Lab color space when the multilayer structure is exposed to broadband electromagnetic radiation and viewed from angles between 0° and 45° relative to a direction normal to an outer surface of the multilayer structure.

18. The multilayer structure of claim 1, wherein each of the core layer, the conformal dielectric layer, and the conformal absorber layer individually has a surface area less than or equal to 10 $m^2/g$.

* * * * *